United States Patent
Choi et al.

(10) Patent No.: US 12,399,014 B2
(45) Date of Patent: Aug. 26, 2025

(54) MAP COMPRESSION METHOD FOR INDOOR POSITIONING

(71) Applicant: Korea University Research and Business Foundation, Seoul (KR)

(72) Inventors: Lynn Choi, Seoul (KR); Han Jun Bae, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 2 days.

(21) Appl. No.: 18/018,153

(22) PCT Filed: Jan. 4, 2022

(86) PCT No.: PCT/KR2022/000063
§ 371 (c)(1),
(2) Date: Jan. 26, 2023

(87) PCT Pub. No.: WO2023/022312
PCT Pub. Date: Feb. 23, 2023

(65) Prior Publication Data
US 2024/0247936 A1     Jul. 25, 2024

(30) Foreign Application Priority Data

Aug. 19, 2021    (KR) ........................ 10-2021-0109380

(51) Int. Cl.
    *G01C 21/20*       (2006.01)
    *G01C 21/00*       (2006.01)
    *G01S 5/02*         (2010.01)

(52) U.S. Cl.
CPC ......... *G01C 21/206* (2013.01); *G01C 21/383* (2020.08); *G01C 21/3863* (2020.08); *G01S 5/02* (2013.01); *G01S 2205/02* (2020.05)

(58) Field of Classification Search
CPC .......... G06F 2212/401; G06F 16/1744; G06F 12/0292; G01C 21/383; G01C 21/206; G01C 21/3863; G01S 2205/02; G01S 5/02

See application file for complete search history.

(56) References Cited

U.S. PATENT DOCUMENTS 9,167,440 B2    10/2015    Kim et al.
11,002,669 B2    5/2021    Wetzel et al.
(Continued)

FOREIGN PATENT DOCUMENTS

DE      102020134684 A1 * 12/2021 ............. G06F 30/20
JP        2015-186009 A     10/2015
(Continued)

OTHER PUBLICATIONS

Korean Office Action issued on Dec. 20, 2023 in corresponding Korean Patent Application No. 10-2020-0109380 (5 pages in Korean).

*Primary Examiner* — Khalid W Shaheed
(74) *Attorney, Agent, or Firm* — NSIP Law

(57) ABSTRACT

Disclosed is a low memory based indoor positioning method performed by a computing device including at least one processor. The method may include: extracting coordinate information in which a sensing value is not recorded as empty space information from map data in which each of a plurality of sensing values measured in a plurality of coordinates is recorded; generating a sensing value array including the plurality of sensing values; and storing the empty space information and the sensing value array in a memory.

11 Claims, 7 Drawing Sheets

(56) References Cited

U.S. PATENT DOCUMENTS

| | | |
|---|---|---|
| 2011/0202273 A1 | 8/2011 | Nogtev et al. |
| 2019/0049231 A1 | 2/2019 | Choi et al. |
| 2021/0140770 A1 | 5/2021 | Song et al. |

FOREIGN PATENT DOCUMENTS

| | | |
|---|---|---|
| KR | 10-2011-0093258 A | 8/2011 |
| KR | 10-2012-0071291 A | 7/2012 |
| KR | 10-2012-0071643 A | 7/2012 |
| KR | 10-1516769 B1 | 5/2015 |
| KR | 10-1833217 B1 | 3/2018 |
| KR | 10-2018-0042546 A | 4/2018 |
| KR | 10-2242064 B1 | 4/2021 |
| KR | 10-2243917 B1 | 4/2021 |
| KR | 10-2273573 B1 | 7/2021 |

\* cited by examiner

[FIG. 1]
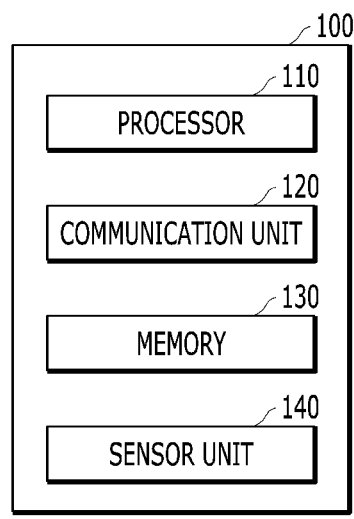

[FIG. 2]
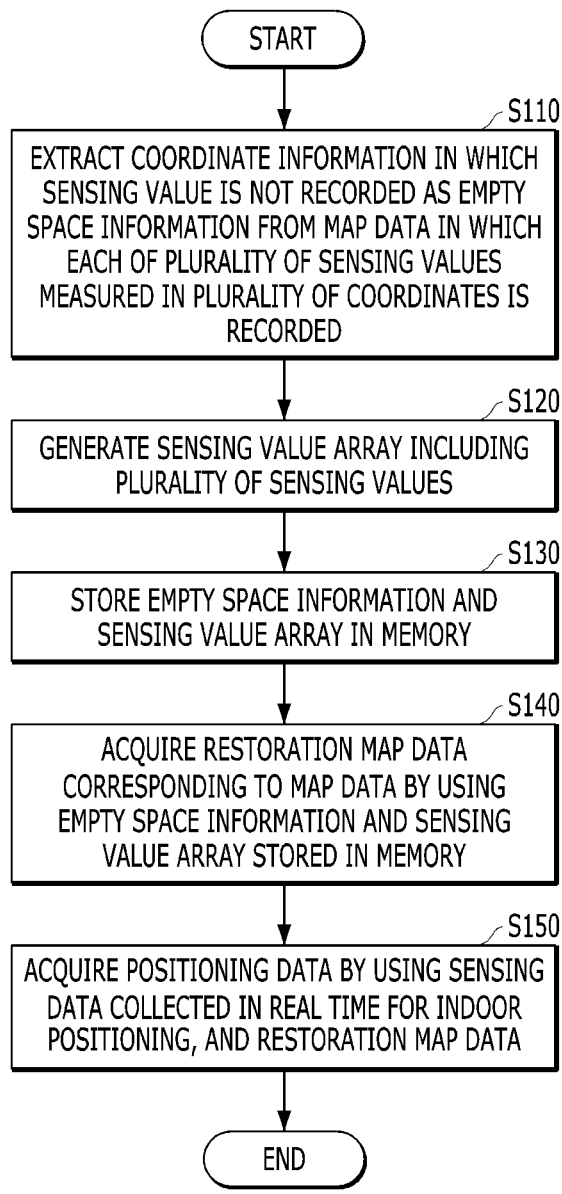

[FIG. 3]
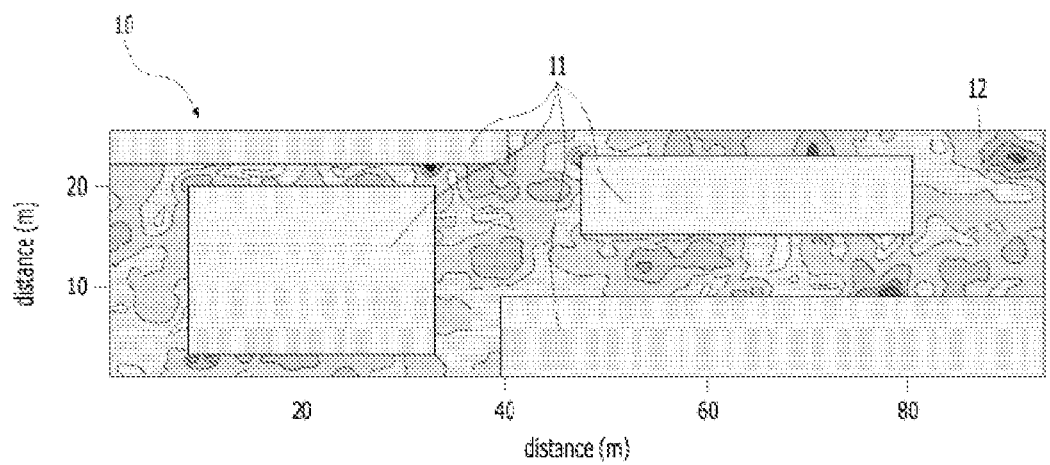

[FIG. 4]

|   | 21 |   |   |
|---|---|---|---|
| 0 | 0 | 1 | 1 |
| 0 | 1 | 0 | 1 |
| 1 | 1 | 0 | 1 |
| 1 | 0 | 1 | 1 |

22

+

23
16,20,15,9,3
0,21,8,17,6,2

=

30

| nan | nan | 16 | 20 |
|---|---|---|---|
| nan | 15 | nan | 9 |
| 30 | 21 | nan | 8 |
| 17 | nan | 6 | 2 |

[FIG. 5]
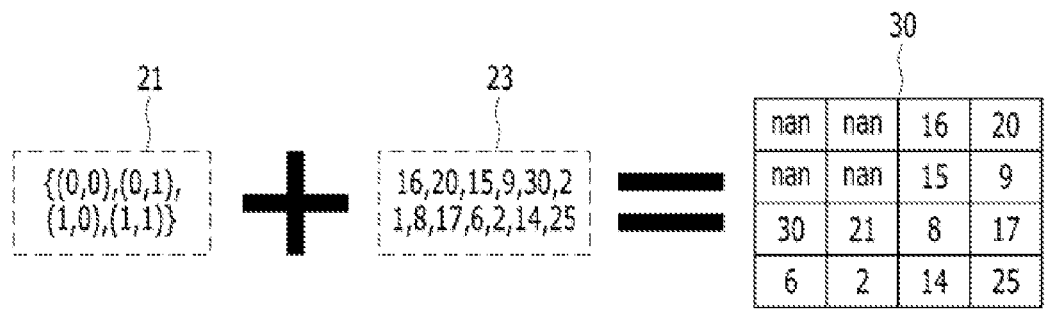

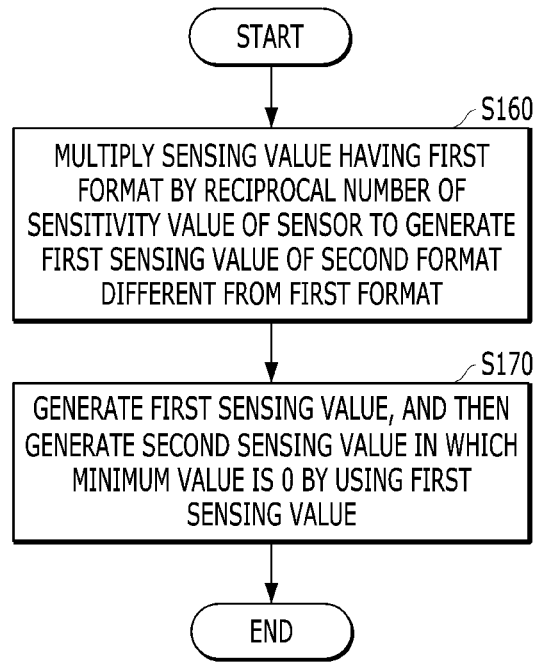

[FIG. 7]
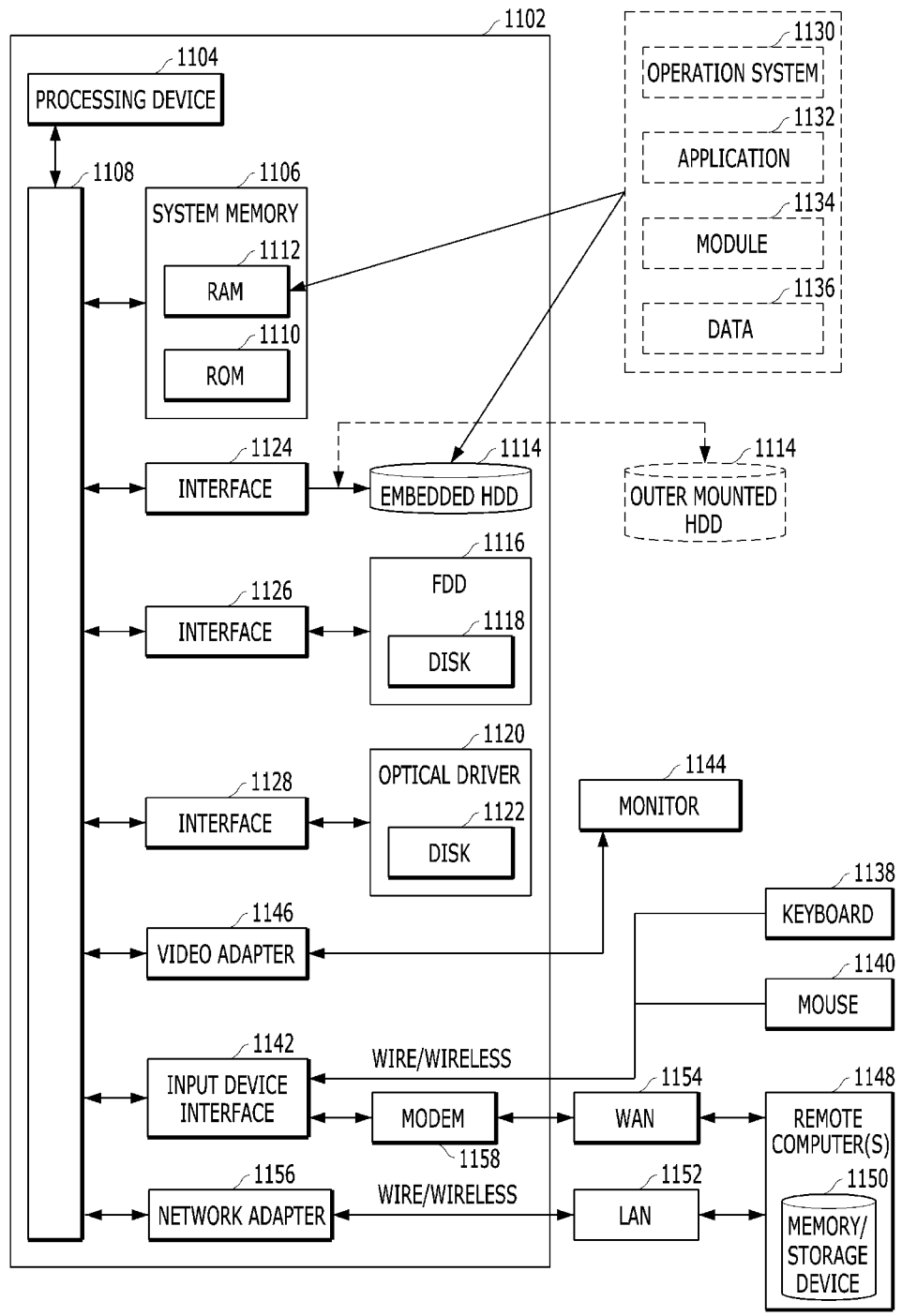

MAP COMPRESSION METHOD FOR INDOOR POSITIONING

CROSS REFERENCE TO RELATED APPLICATIONS

This application is a U.S. National Stage Application of International Application No. PCT/KR2022/000063, filed on Jan. 4, 2022, which claims the benefits under 35 USC 119(a) and 365(b) of Korean Patent Application No. 10-2021-0109380, filed on Aug. 19, 2021 in the Korean Intellectual Property Office, the entire disclosure of which is incorporated herein by reference for all purposes.

TECHNICAL FIELD

The present disclosure relates to a map compression method for indoor positioning, and particularly, to a method for performing indoor positioning with a low memory through map compression.

BACKGROUND ART

Earth's magnetic field and RF-based indoor positioning estimate a current location through comparison between a magnetic field map and a radio map which are precollected, and data collected in real time. A device for the indoor positioning should be basically equipped with an IMU sensor, an RF module, etc., and as the device for the indoor positioning, a smart device such as a smartphone, a tablet PC, etc., is primarily used. However, the use of the smart device for the indoor positioning may be inefficient in terms of cost, weight, and power consumption. Further, it may be impossible to provide an indoor positioning based service using the smart device in a region or a place where carrying the smart device is impossible, such as a factory, a hospital, etc.

Therefore, even in an environment in which carrying the smart device is impossible, a need for a device capable of the indoor positioning is required.

For example, when the indoor positioning is performed with an embedded type small device instead of the smart device, it is possible to provide an indoor position based service regardless of a constraint of the smart device. However, there is a problem in that since the small device is the form of an embedded system, a capacity of the memory is small.

Therefore, there may be a demand for technology capable of efficiently using the small device for performing the indoor positioning in the art.

In this regard, Korean Patent Registration No. 10-1871052 discloses a hybrid indoor positioning system and a method thereof.

DISCLOSURE

Technical Problem

The present disclosure has been made in an effort to provide a method for performing indoor positioning with a low memory through map compression.

However, technical objects of the present disclosure are not restricted to the technical object mentioned as above. Other unmentioned technical objects will be apparently appreciated by those skilled in the art by referencing to the following description.

Technical Solution

An exemplary embodiment of the present disclosure provides a low memory based indoor positioning method performed by a computing device including at least one processor. The method may include: extracting coordinate information in which a sensing value is not recorded as empty space information from map data in which each of a plurality of sensing values measured in a plurality of coordinates is recorded; generating a sensing value array including the plurality of sensing values; and storing the empty space information and the sensing value array in a memory.

The method may further include: acquiring restoration map data corresponding to the map data by using the empty space information and the sensing value array stored in the memory; and acquiring positioning data by using sensing data collected in real time for indoor positioning, and the restoration map data.

The empty space information may include a table in which a first identification value for identifying a coordinate in which the sensing value is not recorded or a second identification value for identifying a coordinate in which the sensing value is recorded is mapped to each of the plurality of coordinates, and the sensing value array may be a data array in which sensing values are sequentially listed from a reference sensing value measured in a reference coordinate.

The acquiring of the restoration map data corresponding to the map data by using the empty space information and the sensing value array stored in the memory may include acquiring the map data by inserting sequentially one or more sensing value included in the sensing value array into one or more coordinates mapped to the second identification value.

The extracting of the coordinate information in which the sensing value is not recorded as the empty space information from the map data in which each of the plurality of sensing values measured in the plurality of coordinates is recorded may include recognizing an empty space area formed based on two or more coordinates when two or more coordinates in which the sensing value is not recorded are adjacent to each other, and extracting empty space information including information on the empty space area in the map data.

The empty space information may include a table in which a third identification value for recognizing the empty space area formed based on two or more coordinates or a fourth identification value for identifying the remaining coordinates other than the empty space area is mapped to each of the plurality of coordinates, and the empty space area may have at least two coordinates among two or more coordinates as vertexes.

The acquiring of the restoration map data corresponding to the map data by using the empty space information and the sensing value array stored in the memory may include acquiring the map data by sequentially inserting one or more sensing value included in the sensing value array into one or more coordinates mapped to the fourth identification value.

The method may further include reducing a size of each of the plurality of sensing values by using a sensitivity value of a sensor related to measurement of the plurality of sensing values, and the map data may be magnetic field map data, and the sensing value may be a magnetic field value.

Further, the reducing of the size of each of the plurality of sensing values by using the sensitivity value of the sensor related to measurement of the plurality of sensing values may include multiplying the sensing value having a first format by a reciprocal number of the sensitivity value to generate a first sensing value of a second format different from the first format, and the size of the first sensing value having the second format may be smaller than the size of the sensing value having the first format. Further, the method may further include generating the first sensing value, and then generating a second sensing value in which a minimum value is 0 by using the first sensing value.

The generating of the first sensing value, and then generating the second sensing value in which the minimum value is 0 by using the first sensing value may include subtracting the minimum value of the first sensing value from the first sensing value and generating the second sensing value.

The acquiring of the restoration map data corresponding to the map data by using the empty space information and the sensing value array stored in the memory may include acquiring the restoration map data constituted by the plurality of sensing values by multiplying a value acquired by adding the second sensing value and the minimum value of the first sensing value by the sensitivity value when acquiring the restoration map data constituted by the second sensing value.

Technical solving means which can be obtained in the present disclosure are not limited to the aforementioned solving means and other unmentioned solving means will be clearly understood by those skilled in the art from the following description.

Advantageous Effects

According to an exemplary embodiment of the present disclosure, a method for performing indoor positioning with a low memory by reducing a memory required for performing the indoor positioning can be provided.

Effects which can be obtained in the present disclosure are not limited to the aforementioned effects and other unmentioned effects will be clearly understood by those skilled in the art from the following description.

DESCRIPTION OF DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIG. 1 is a block diagram of a computing device in which various aspects of the present disclosure may be implemented.

FIG. 2 is a flowchart for describing an example of a method for indoor positioning based on a low memory according to some exemplary embodiments of the present disclosure.

FIG. 3 is a diagram illustrating an example of map data according to some exemplary embodiments of the present disclosure.

FIG. 4 is a flowchart for describing an example of a method for acquiring restoration map data according to some exemplary embodiments of the present disclosure.

FIG. 5 is a flowchart for describing another example of a method for acquiring restoration map data according to some exemplary embodiments of the present disclosure.

FIG. 6 is a diagram for describing an example of a method for changing and compressing a format of map data according to some exemplary embodiments of the present disclosure.

FIG. 7 is a simple and general schematic view for an exemplary computing environment in which exemplary embodiments of the present disclosure may be implemented.

BEST MODE

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Various aspects and features will be presented by a system which can include one or more apparatuses, terminals, servers, devices, components, and/or modules. It should also be appreciated and recognized that various systems can include additional apparatuses, terminals, servers, devices, components, and/or modules and/or that the various systems cannot include all of the apparatuses, terminals, servers, devices, components, modules, and the like discussed in association with the drawings.

"Computer program", "component", "module", "system", and the like which are terms used in this specification may be used to be compatible with each other and refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

The components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Hereinafter, like reference numerals refer to like or similar elements regardless of reference numerals and a duplicated description thereof will be omitted. Further, in describing an embodiment disclosed in the present disclosure, a detailed description of related known technologies will be omitted if it is determined that the detailed description makes the gist of the embodiment of the present disclosure unclear. Further, the accompanying drawings are only for easily understanding the exemplary embodiment disclosed in this specification and the technical spirit disclosed by this specification is not limited by the accompanying drawings.

The terminology used in this specification is for the purpose of describing embodiments only and is not intended to limit the present disclosure. In the present disclosure, the singular form also includes the plural form, unless the context indicates otherwise. It is to be understood that the terms "comprise" and/or "comprising" used in the present disclosure does not exclude the presence or addition of one or more other components other than stated components.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

The terms "information" and "data" used in the specification may also be often used to be exchanged with each other.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice. However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

The scope of the operations in the claims of the present disclosure arises from the functions and features described in respective steps and is not affected by the order in which respective steps in the claims are disclosed if a sequence relationship of the disclosed order in respective steps constituting the method is not specified. For example, in the claims set forth in the step including steps A and B, the scope of rights is not limited to the fact that step A precedes step B, even if step A is described before step B.

FIG. 1 is a block diagram of a computing device in which various aspects of the present disclosure may be implemented.

In some exemplary embodiments of the present disclosure, the computing device 100 may include a processor 110, a communication unit 120, a memory 130, and a sensor unit 140. However, components described above are not required in implementing the computing device 100, so the computing device 100 may have components more or less than components listed above.

According to some exemplary embodiments of the present disclosure, the computing device 100 may be an embedded system for performing indoor positioning. However, the present disclosure is not limited thereto.

The computing device 100 may include a predetermined type computer system or computer device such as an embedded, a microprocessor, a main frame computer, a digital processor, a portable device, and a device controller. However, the present disclosure is not limited thereto.

The processor 110 of the computing device 100 generally controls an overall operation of the computing device 100. The processor 110 processes a signal, data, information, and the like input or output through the components or drives the application program stored in the memory 130 to provide or process information or a function appropriate for the user.

The processor 110 may control at least some of the components of the computing device 100 in order to drive the application program stored in the memory 130. Furthermore, the processor 110 may combine and operate at least two of the components included in the computing device 100 in order to drive the application program.

According to some exemplary embodiments of the present disclosure, the processor 110 may extract coordinate information in which a sensing value is not recorded in map data in which each of a plurality of sensing values measured in a plurality of coordinates is recorded as empty space information. Here, the map data may be acquired before the indoor positioning is performed, and pre-stored in the memory 130. However, the present disclosure is not limited thereto.

Meanwhile, the processor 110 may generate a sensing value array including a plurality of sensing values. Further, the processor 110 may store the empty space information and the sensing value array in the memory 130. That is, the processor 110 may compress the map data into the empty space information and the sensing value array. Here, the sensing value array may be a data array in which data allocated to respective coordinates are listed in the map data.

When the processor 110 performs the indoor positioning, the processor 110 may acquire the restoration map data corresponding to the map data by using the empty space information and the sensing value array stored in the memory 130. In addition, the processor 110 may acquire positioning data by using sensing data collected in real time by the sensor unit 140 and the restoration map data for the indoor positioning. That is, the processor 110 may acquire the restoration map data acquired by restoring the map data by using the empty space information and the sensing value array generated as the map data is compressed. The restoration map data may be the same as the map data. However, the present disclosure is not limited thereto.

Here, the sensor unit 140 may acquire a sensing value for recognizing the current location of the user. For example, the sensor unit 140 may be at least one of a magnetic field sensor, an inertial measurement unit (IMU) sensor for measuring a velocity and a direction, a gravity, and an acceleration of a target, and a radio frequency (RF) sensor.

Hereinafter, a method in which the processor 110 of the computing device 100 extracts the empty space information and generates the sensing value array in the map data, and a method in which the processor 110 acquires the positioning data by using the restoration map data will be described below with reference to FIGS. 2 to 6.

The communication unit 120 of the computing device 100 may include one or more modules which enable communication between the computing device 100 and a server (e.g., positioning data analysis server or positioning data based service providing server) and between the computing device 100 and the user terminal. In addition, the communication unit 120 may include one or more modules that connect the computing device 100 to one or more networks.

According to some exemplary embodiments of the present disclosure, the communication unit 120 may receive a positioning data request signal from the server. Further, the communication unit 120 may transmit the positioning data to the server.

For example, the processor 110 of the computing device 100 may control the communication unit 120 to transmit the positioning data to the server in order to receive a location based service (e.g., an indoor navigation service) provided from the server. However, the present disclosure is not limited thereto.

A network which connects communication between the computing device 100 and the user terminal and between the computing device 100 and the server may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented here may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

The network according to the exemplary embodiments of the present disclosure may be configured regardless of communication modes such as wired and wireless modes and constituted by various communication networks including a local area network (LAN), a wide area network (WAN), and the like. Further, the network may be known World Wide Web (WWW) and may adopt a wireless transmission technology used for short-distance communication, such as infrared data association (IrDA) or Bluetooth.

The techniques described in this specification may also be used in other networks in addition to the aforementioned networks.

The memory 130 of the computing device 100 may store a program for an operation of the processor 110 and temporarily or persistently store input/output data. Further, the memory 130 may store the map data or a map segment used for the indoor positioning. The memory 130 may include at least one type of storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Various exemplary embodiments described herein may be implemented in a computer or a recording medium or and a storage medium readable by a device similar to the computer by using, for example, software, hardware, or a combination thereof.

According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the processor 110 itself of the computing device 100.

According to software implementation, embodiments such as a procedure and a function described in the present disclosure may be implemented by separate software modules. Each of the software modules may perform one or more functions and operations described in the specification. A software code may be implemented by a software application written by an appropriate program language. The software code may be stored in the memory 130 of the computing device 100 and executed by the processor 110 of the computing device 100.

FIG. 2 is a flowchart for describing an example of a method for indoor positioning based on a low memory according to some exemplary embodiments of the present disclosure. FIG. 3 is a diagram illustrating an example of map data according to some exemplary embodiments of the present disclosure. FIG. 4 is a flowchart for describing an example of a method for acquiring restoration map data according to some exemplary embodiments of the present disclosure. FIG. 5 is a flowchart for describing another example of a method for acquiring restoration map data according to some exemplary embodiments of the present disclosure.

Referring to FIG. 2, the processor 110 of the computing device 100 may extract coordinate information in which a sensing value is not recorded in map data in which each of a plurality of sensing values measured in a plurality of coordinates is recorded as empty space information (S110). Further, the processor 110 of the computing device 110 may generate a sensing value array including a plurality of sensing values (S120). Further, the processor 110 may store the empty space information and the sensing value array in the memory 130.

Specifically, referring to FIG. 3, exemplary map data is visualized and illustrated.

As illustrated, the map data 10 may be constituted by a first area 11 in which the sensing value is not recorded and a second area 12 in which the sensing value is recorded. However, the present disclosure is not limited thereto.

The processor 110 of the computing device 100 may extract, as empty space information, coordinate information (i.e., coordinate information in which the sensing value is not recorded) related to the first area 11 in which the sensing value is not recorded in the map data 10. Further, the processor 110 may generate the sensing value array including a plurality of sensing values (specifically, a plurality of sensing values recorded in coordinates, respectively) related to the second area 12 in which the sensing value is recorded. In addition, the processor 110 may store the empty space information and the sensing value array in the memory 130.

Referring back to FIG. 2, the computing device 100 may perform the steps store (S110, S120, and S130) of extracting or generating each of the empty space information and the sensing value array in the memory 130, and then perform the indoor positioning.

According to some exemplary embodiment of the present disclosure, the processor 110 of the computing device 100 may acquire the restoration map data corresponding to the map data by using the empty space information and the sensing value array stored in the memory 130 in order to perform the indoor positioning (S140). In addition, the processor 110 may acquire positioning data by using sensing data collected in real time and the restoration map data for the indoor positioning (S150).

For example, referring to FIG. 4, the exemplary empty space information and sensing value array are illustrated.

Here, the empty space information may include a table 21 in which a first identification value (e.g., 0) for identifying the coordinate in which the sensing value is not recorded or a second identification value (e.g., 1) for identifying the coordinate in which the sensing value is recorded is mapped to each of the plurality of coordinates. For example, the empty space information may include a bitmap in which 0 which is the first identification value or 1 which is the second identification value is mapped to each of the plurality of coordinates. However, the present disclosure is not limited thereto.

The sensing value array 23 may be a data array in which sensing values are sequentially listed from a reference sensing value measured in a reference coordinate. For example, the reference coordinate may be (1, 1). That is, the reference coordinate may be a coordinate corresponding to a first row and a first column. However, the present disclosure is not limited thereto.

The processor 110 of the computing device 100 sequentially inserts one or more sensing values included in the sensing value array 23 into one or more coordinates mapped to the second identification value in order to acquire restoration map data 30 to acquire the restoration map data 30.

That is, the restoration map data 30 may be a table type in which each of the sensing values included in the data array 23 is inserted into a coordinate location in which the second identification value (e.g., 1) is recorded. However, the present disclosure is not limited thereto.

Meanwhile, the processor 110 of the computing device 100 compares the sensing value included in the sensing data collected in real time and the sensing values included in the restoration map data 30, and when a difference value is included within a predetermined error range value (e.g., 0.5), the processor 110 may recognize a location related thereto as the current location of the target (i.e., the computing device 100). Here, information on the current location may be included in indoor positioning data. However, the present disclosure is not limited thereto.

For example, when the sensing value included in the sensing data collected in real time is 15.7 and 16 is recorded in the coordinate (1, 3) of the restoration map data 30, 0.3 which is the difference value is included within 0.5 which is the predetermined error range, so the processor 110 may recognize the current location of the target as a location corresponding to the coordinate (1, 3) of the restoration map data 30.

According to other some exemplary embodiments of the present disclosure, when the processor 100 of the computing device 100 extracts coordinate information in which the sensing value is not recorded in the map data in which each of the plurality of sensing values measured in the plurality of coordinates is recorded as the empty space information in step (S110), the processor 110 may recognize an empty space area formed based on one or more coordinates when two or more coordinates in which the sensing value is not recorded are adjacent to each other. In addition, the processor 110 may extract the empty space information including information on the empty space area in the map data. Here, the empty space area may mean an area (i.e., an area which the target is impossible to access) in which the sensing value is not recorded in an indoor positioning place.

For example, referring to FIG. 5, the exemplary empty space information and sensing value array are illustrated.

Here, the empty space information may include a coordinate value 21 for identifying the empty space area in which the sensing value is not recorded. For example, the empty space information may include a coordinate value corresponding to a vertex of the empty space area in which the sensing value is not recorded. As another example, the empty space information may include a coordinate value each empty space area in which the sensing value is not recorded. However, the present disclosure is not limited thereto.

Additionally, the empty space information may include a table in which a third identification value (e.g., NAN) for recognizing the empty space area formed based on two or more coordinates or a fourth identification value (e.g., 1) for identifying the remaining coordinates other than the empty space area is mapped to each of the plurality of coordinates. Here, the empty space area may have at least two coordinates among two or more coordinates as vertexes. However, the present disclosure is not limited thereto.

The sensing value array 23 may be a data array in which sensing values are sequentially listed from a reference sensing value measured in a reference coordinate. For example, the reference coordinate may be (1, 1). That is, the reference coordinate may be a coordinate corresponding to a first row and a first column. However, the present disclosure is not limited thereto.

The processor 110 of the computing device 100 sequentially inserts one or more sensing values included in the sensing value array 23 into one or more coordinates mapped to the fourth identification value in order to acquire restoration map data 30 to acquire the restoration map data 30.

In another form, the processor 110 of the computing device 100 sequentially inserts one or more sensing values included in the sensing value array 23 into each of the coordinates include in the remaining area other than the empty space area in order to acquire restoration map data 30 to acquire the restoration map data 30.

That is, the restoration map data 30 may be a table type in which each of the sensing values included in the data array 23 is inserted into the remaining area (i.e., a coordinate location in which the fourth identification value (e.g., 1) is recorded) other than the empty space area in which the sensing value is not recorded. However, the present disclosure is not limited thereto.

As described above with reference to FIGS. 2 to 5, the computing device 100 of the present disclosure may compress the map data into the empty space information and the sensing value array in order to implement a low memory (here, flash memory) based indoor positioning system. In this case, the computing device 100 of the present disclosure may reduce a capacity of the memory 130 required for storing the map data.

Therefore, the computing device 100 of the present disclosure may perform the indoor positioning with the low memory. In this case, the indoor positioning is performed by the indoor positioning system constituted by the embedded type small device to perform the indoor positioning even an environment in which carrying the smart device is impossible.

According to additional some exemplary embodiments of the present disclosure, the processor 110 of the computing device 100 may reduce the size of each of the plurality of sensing values by using a sensitivity value of a sensor related to measurement of the plurality of sensing values. Here, the map data may be magnetic field map data, and the sensing value may be a magnetic field value.

Hereinafter, a method in which the processor 110 of the computing device 100 reduces the size of each of the plurality of sensing values will be described below with reference to FIG. 6.

FIG. 6 is a diagram for describing an example of a method for changing and compressing a format of map data according to some exemplary embodiments of the present disclosure.

Referring to FIG. 6, the processor 110 of the computing device 100 multiplies a sensing value having a first format by a reciprocal number of a sensitive value of a sensor to generate a first sensing value having a second format different from the first format (S160). Here, the size of the first sensing value having the second format may be smaller than the size of the sensing value having the first format.

Specifically, the processor 110 of the computing device 100 may acquire a first sensing value mag1 by using Equation 1 below.

$$mag1 = mag \times \frac{1}{scale} \quad \text{[Equation 1]}$$

The mag means the sensing value having the first format, scale means the sensitive value, and the mag1 means the first sensing value having the second format.

The processor 110 of the computing device 100 may generate the first sensing value, and then generate a second sensing value in which a minimum value is 0 by using the first sensing value (S170).

Specifically, the processor 110 subtracts the minimum value of the first sensing value from the first sensing value to generate the second sensing value.

More specifically, the processor 110 of the computing device 100 may generate a second sensing value mag2 by using Equation 2 below.

$$mag2 = mag1 - \min(mag1) \quad \text{[Equation 2]}$$

The mag1 means the first sensing value, the min(mag1) means the minimum value of the first sensing value, and the mag2 means the second sensing value.

Meanwhile, when the processor 110 of the computing device 100 acquires restoration map data corresponding to map data in step S140, the processor 110 may also acquire the restoration map data constituted by a plurality of sensing values by multiplying a value acquired by adding the second sensing value and the minimum value of the first sensing value by the sensitivity value when acquiring the restoration map data constituted by the second sensing value.

Specifically, the processor 110 of the computing device 100 may acquire the restoration map data constituted by the plurality of sensing values by using Equation 3 below.

$$mag = (mag2 + \min(mag1)) \times scale \quad \text{[Equation 3]}$$

The mag means any one of the plurality of sensing values, mag2 means the second sensing value, the min(mag1) means the minimum value of the first sensing value, and the scale means the sensitive value.

The computing device 100 of the present disclosure may compress the map data into the empty space information and the sensing value array and additionally perform compression by using the sensitivity value in order to implement the low memory (here, flash memory) based indoor positioning system. In this case, the computing device 100 of the present disclosure may reduce' the capacity of the memory 130 required for storing the map data.

Therefore, the computing device 100 of the present disclosure may perform the indoor positioning with the low memory. In this case, the indoor positioning is performed by the indoor positioning system constituted by the embedded type small device to perform the indoor positioning even in an environment in which carrying the smart device is impossible.

FIG. 7 is a general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term "manufactured article" includes computer programs or media which are accessible by a predetermined computer-readable device. For example, a computer readable storage media includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, possess, and/or transfer instruction(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

The invention claimed is:

1. A low memory based indoor positioning method performed by a computing device including at least one processor, the method comprising:
   extracting coordinate information in which a sensing value is not recorded as empty space information from map data in which each of a plurality of sensing values measured in a plurality of coordinates is recorded;
   generating a sensing value array including the plurality of sensing values;
   storing the empty space information and the sensing value array in a memory;
   acquiring restoration map data corresponding to the map data by using the empty space information and the sensing value array stored in the memory; and
   acquiring positioning data by using sensing data collected in real time for indoor positioning, and the restoration map data.

2. The low memory based indoor positioning method of claim 1, wherein the empty space information includes a table in which a first identification value for identifying a coordinate in which the sensing value is not recorded or a second identification value for identifying a coordinate in which the sensing value is recorded is mapped to each of the plurality of coordinates, and
   the sensing value array is a data array in which the sensing values are sequentially listed from a reference sensing value measured in a reference coordinate.

3. The low memory based indoor positioning method of claim 2, wherein the acquiring of the restoration map data corresponding to the map data by using the empty space information and the sensing value array stored in the memory includes acquiring the map data by sequentially inserting one or more sensing value included in the sensing value array into one or more coordinates mapped to the second identification value.

4. The low memory based indoor positioning method of claim 1, wherein the extracting of the coordinate information in which the sensing value is not recorded as the empty space information from the map data in which each of the plurality of sensing values measured in the plurality of coordinates is recorded includes:
   recognizing an empty space area formed based on two or more coordinates when two or more coordinates in which the sensing value is not recorded are adjacent to each other; and extracting empty space information including information on the empty space area in the map data.

5. The low memory based indoor positioning method of claim 4, wherein the empty space information includes a table in which a third identification value for recognizing the empty space area formed based on the two or more coordinates or a fourth identification value for identifying the remaining coordinates other than the empty space area is mapped to each of the plurality of coordinates, and the empty space area has at least two coordinates among the two or more coordinates as vertexes.

6. The low memory based indoor positioning method of claim 5, wherein the acquiring of the restoration map data corresponding to the map data by using the empty space information and the sensing value array stored in the memory includes acquiring the map data by sequentially inserting one or more sensing value included in the sensing value array into one or more coordinates mapped to the fourth identification value.

7. The low memory based indoor positioning method of claim 1, further comprising:
reducing a size of each of the plurality of sensing values by using a sensitivity value of a sensor related to measurement of the plurality of sensing values,
wherein the map data is magnetic field map data, and the sensing value is a magnetic field value.

8. The low memory based indoor positioning method of claim 7, wherein the reducing of the size of each of the plurality of sensing values by using the sensitivity value of the sensor related to measurement of the plurality of sensing values includes:
multiplying the sensing value having a first format by a reciprocal number of the sensitivity value to generate a first sensing value of a second format different from the first format, and
wherein the size of the first sensing value having the second format is smaller than the size of the sensing value having the first format.

9. The low memory based indoor positioning method of claim 8, further comprising:
generating the first sensing value, and then generating a second sensing value in which a minimum value is 0 by using the first sensing value.

10. The low memory based indoor positioning method of claim 8, wherein the generating of the first sensing value, and then generating the second sensing value in which the minimum value is 0 by using the first sensing value includes subtracting the minimum value of the first sensing value from the first sensing value and generating the second sensing value.

11. The low memory based indoor positioning method of claim 10, wherein the acquiring of the restoration map data corresponding to the map data by using the empty space information and the sensing value array stored in the memory includes acquiring the restoration map data constituted by the plurality of sensing values by multiplying a value acquired by adding the second sensing value and the minimum value of the first sensing value by the sensitivity value when acquiring the restoration map data constituted by the second sensing value.

\* \* \* \* \*